Nov. 5, 1968    E. ZILLMER    3,409,353

PHOTOGRAPHIC PROJECTOR WITH CIRCULAR MAGAZINE

Filed March 22, 1966    3 Sheets-Sheet 1

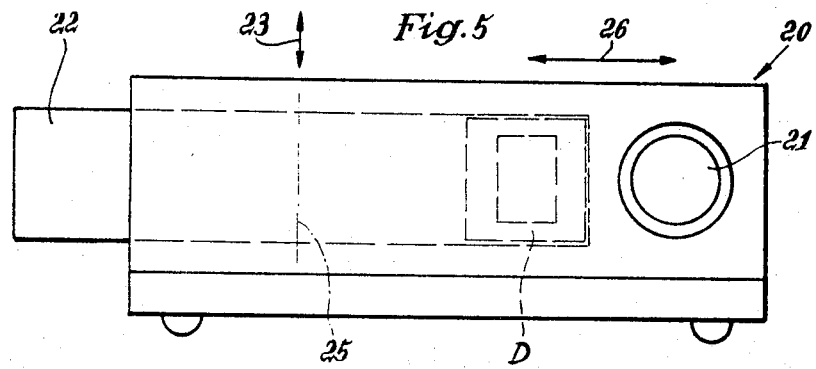
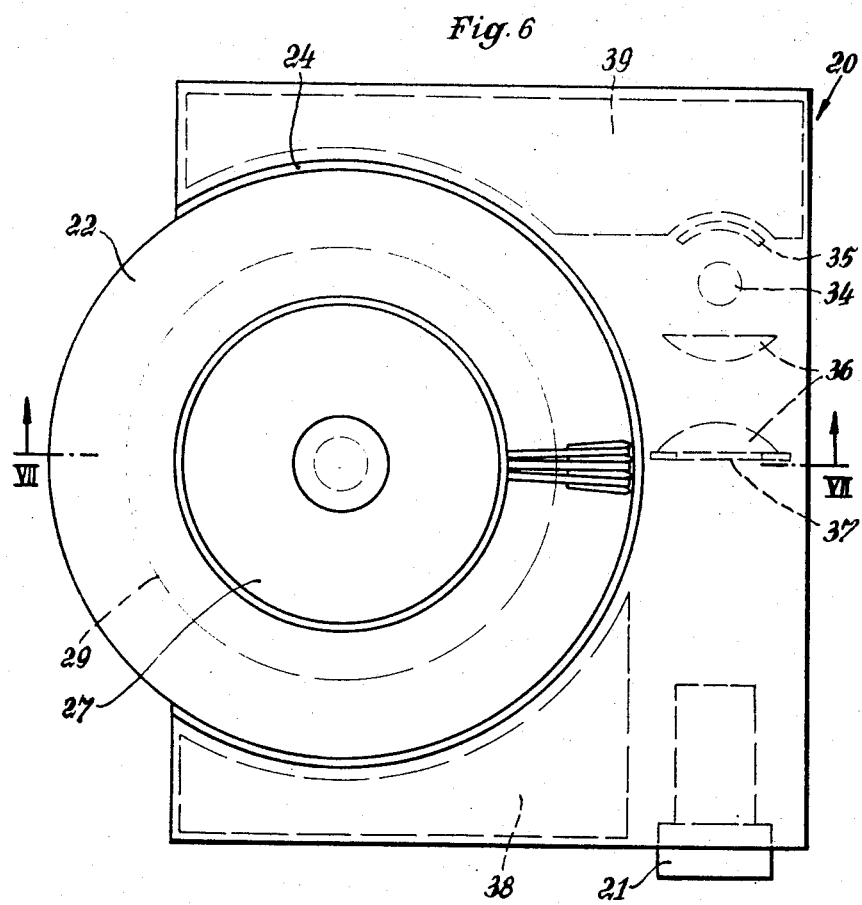

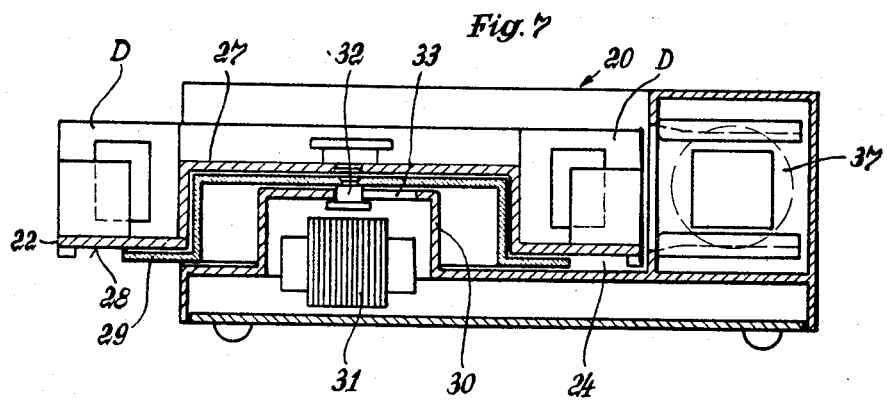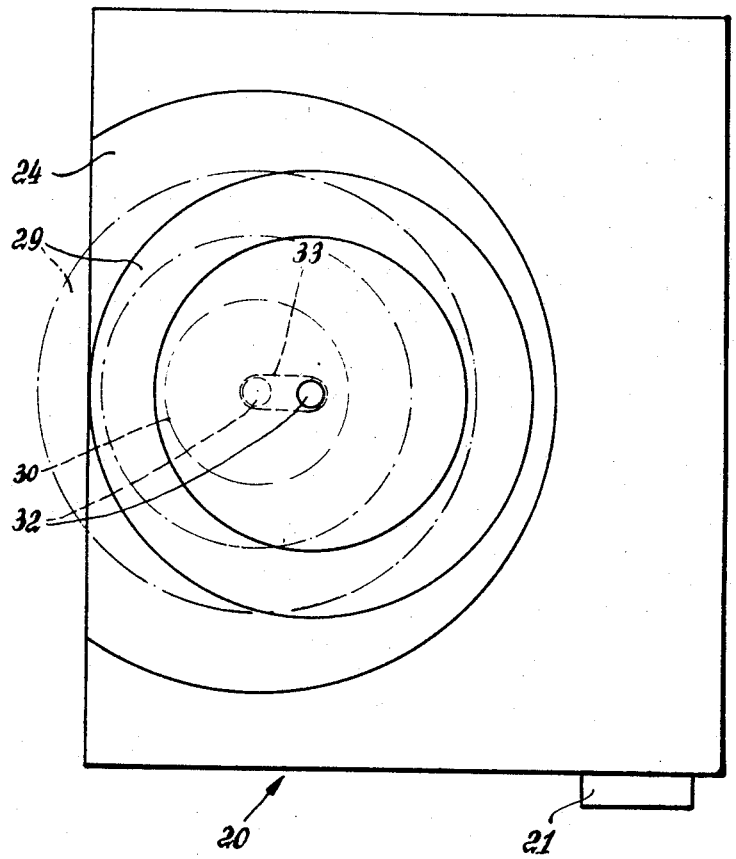

United States Patent Office 3,409,353
Patented Nov. 5, 1968

3,409,353
PHOTOGRAPHIC PROJECTOR WITH
CIRCULAR MAGAZINE
Erich Zillmer, Braunschweig, Germany, assignor to
Voigtlander A.G.
Filed Mar. 22, 1966, Ser. No. 536,424
Claims priority, application Germany, Mar. 26, 1965,
Z 11,435
2 Claims. (Cl. 353—117)

ABSTRACT OF THE DISCLOSURE

A photographic projector for coacting with a rotary magazine. The projector has a generally rectangular housing having at one side an image-projecting system. A bearing member carried by the housing supports a circular magazine for rotary movement. The magazine has more than half of its circular exterior periphery situated within the housing so that the generally rectangular periphrey of the latter remains substantially unchanged. The bearing member includes a rotary carrier which supports the magazine while the housing supports the rotary carrier for lateral movement toward and away from that side of the housing where the image-projecting system is situated.

---

The present invention relates to photographic projectors.

In particular, the present invention relates to that type of photographic projector which is adapted to use a circular magazine.

Photographic projectors which use circular magazines take three basic forms in which the manners of positioning the circular magazine with respect to the projector housing are respectively different from each other.

According to a first known construction, the circular magazine is in a vertical attitude and has a horizontal axis of rotation, the magazine being carried in this position by the housing of the projector.

A second known type of photographic projector has a construction which supports the circular magazine above the housing of the projector on top of the latter, with the magazine having in this case a vertical axis of rotation.

Finally, it is also known to provide to one side of the housing of the projector a rotary circular magazine having a vertical axis of rotation.

With all of these known types of photographic projectors the circular magazine, when connected with the projector housing, extends either entirely or to a very large extent beyond the space bounded by the top and sides of the projector housing. As a result, the dimensions of the entire structure are considerably enlarged in an undesirable manner. With these conventional structures, the joining of the circular magazine to the projector housing results in a device which does not have a relatively flat rectangular configuration, as is most frequently encountered at the present time with widely used commercial projectors having elongated, linearly extending magazines. Projectors of this latter type are provided in the interior of the housings with linearly extending guide channels or the like for receiving and supporting the elongated magazines which therefore do not project beyond the exterior limits of the housing in an undesirable manner.

It is therefore a primary object of the present invention to provide for a photographic projector which uses a circular magazine construction where the magazine, when used, will not project undesirably beyond the volume bounded by the top and sides of the projector housing.

In particular, it is an object of the present invention to provide for a projector which uses a circular magazine an outline, even during use with the circular magazine, corresponding to that of known projectors which use non-circular magazines.

It is furthermore an object of the invention to provide a magazine housing with a structure which can very conveniently receive a circular magazine while at the same time making it very easy to remove the magazine from the housing.

Also, it is an object of the present invention to provide for a projector of the above type a structure in which advantage is taken of all free spaces so as to keep the entire construction as compact as possible.

In addition, it is an object of the invention to provide a photographic projector which can cooperate with the different circular magazines of different diameters.

Primarily, with the structure of the invention the projector includes a housing means having a generally rectangular outer periphery defined in pair by a pair of opposed sides of the housing means which carries in its interior adjacent and extending along one of its opposed sides an image-forming means which will project an image from a slide located at a projecting position with respect to the image-forming means. A circular magazine means is provided to carry slides which are to be displaced successively to and from the above projecting position, and a bearing means is carried by the housing means between its opposed sides to support the circular magazine means for rotary movement in a position where the slides can be successively displaced laterally beyond the magazine means to the projecting position and then back to the magazine means. The housing means extends to an elevation which is at least as high as the uppermost part of the magazine means when the latter is supported by the bearing means, so that the magazine means does not project upwardly beyond the housing means, and in addition the exterior circular periphery of the magazine means is situated almost entirely within the substantially rectangular periphery of the housing means, so that the relatively flat generally rectangular outline of the housing means is not undesirably disturbed or extended by the magazine means, with the structure of the invention.

The invention is illustrated by way of example in the accompanying drawings which form part of the application and in which:

FIG. 5 is a front elevation of a photographic projector constructed in accordance with the present invention;

FIG. 6 is a top plan view of the structure of FIG. 5;

FIG. 7 is a transverse section taken along line VII—VII of FIG. 6 in the direction of the arrows; and FIG. 8 shows the projector of FIGS. 5–7 in a top plan view but without the circular magazine.

Figure 1:
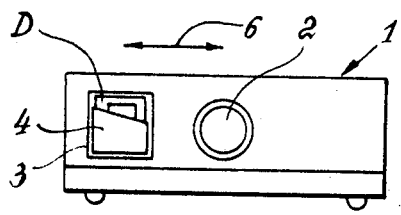
FIG. 1 is a front schematic elevation of a known type of photographic projector which accommodates a linearly extending magazine.

Referring now to FIG. 1, there is illustrated therein a photographic projector 1 adapted to accommodate a straight magazine and having the relatively flat, low construction which is now conventional. To one side of the objective 2 of the projector is situated an elongated magazine-guiding channel 3 which extends parallel to the optical axis and which receives and guides the elongated, straight magazine 4. The slides D are successively displaced out of the magazine 4 to a projecting position and then back into the magazine 4, as indicated by the double-headed arrow 6.

The projector of FIG. 1 with its low, relatively flat outline and with its accommodation in its interior of the guide for the magazine is preferred by purchasers of projectors because of the exterior outline of the projector.

Figure 2:
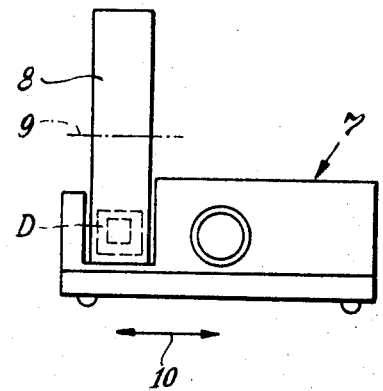
FIGS. 2–4 are respectively schematic front elevations of different types of conventional photographic projectors which cooperate with circular magazines.

In FIG. 2 is shown a projector 7 having a circular magazine 8 situated in a vertical attitude. The magazine 8 has an axis of rotation 9 indicated in dot-dash lines, and the magazine 8 of course turns around this horizontal axis. The slides D move back and forth to and from the projecting position in the direction indicated by the double-headed arrow 10 in FIG. 2.

Figure 3:
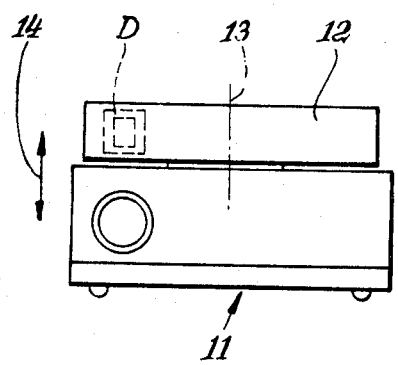

With the conventional projector construction of FIG. 3, the projector 11 carries at its upper portion a circular magazine 12 having a vertical axis of rotation 13, shown in dot-dash lines. The slides D are displaced to and from the magazine between the latter and the projecting position in the manner indicated by the double-headed arrow 14.

Figure 4:
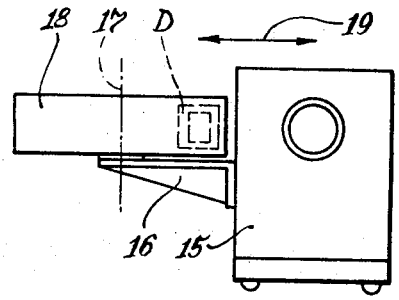

In FIG. 4, there is schematically indicated yet another type of projector 15 for use with a circular magazine 18. In this case the housing of the projector fixedly carries at one side a support 16 on which the magazine 18 is supported for rotary movement about the vertical axis 17, indicated in dot-dash lines. The slides D with this construction move horizontally back and forth between the magazine and the projecting position, as indicated by the double-headed arrow 19.

It is apparent from a comparison of FIGS. 2–4 with FIG. 1 that the different types of projectors which cooperate with circular magazines have an exterior configuration and size which is far less preferable than the exterior configuration and size of the projector of FIG. 1.

The structure of the invention which is illustrated in FIGS. 5–8, by way of example, avoids these drawbacks for a projector which uses a circular magazine. Thus, referring to FIGS. 5–8, it will be seen that the projector 20 of the present invention which is illustrated therein, while using a circular magazine, will nevertheless, as a result of the structure of the present invention, conform to a very large extent to the configuration of the device which is illustrated in FIG. 1.

In FIGS. 5–8, the projector housing means 20 carries an objective 21 and a circular magazine means 22 set into and removed from the housing means 20 in the direction indicated by the double-headed arrow 23 in FIG. 5. Thus, the magazine means 22 is lowered into the housing means 20 and is raised outwardly therefrom. For this purpose the housing means 20 of the projector is provided with a recess 24 whose configuration conforms generally to that of the magazine so as to accept the latter, and the size and position of the magazine-receiving recess 24 is such that the magazine means 22 situated therein is located for the most part within the volume defined by the top and outer periphery of the housing means 20. Thus, as may be seen from FIGS. 5 and 6, the housing means 20 extends to an elevation which is at least as high as the uppermost part of the magazine means 22, when the latter is connected with the housing means 20, and in addition the magazine means 22 projects to only a relatively small extent beyond the left side of the housing means 20, as viewed in FIGS. 5 and 6. As is apparent from FIG. 6 in particular, substantially more than one half of the exterior circular periphery of the magazine means 22 is accommodated within the space between the opposed left and right sides of the housing 20, as viewed in FIG. 6. The rotary turning axis 25 of the magazine means is shown in dot-dash lines in FIG. 5. The circular magazine means 22 is of that type where the several slides D are laterally moved outwardly beyond the magazine means to the projecting position and then in the opposite direction back into the magazine means, so that the slides are successively displaced in the manner indicated by the double-headed arrow 26 in FIG. 5.

The housing means 20 carries between its opposed left and right sides, as viewed in FIGS. 5 and 6, a bearing means which supports the circular magazine means 22 for rotary movement about the axis 25, and this bearing means includes a rotary carrier plate of disc-shaped, relatively flat construction. However, in the case where the circular magazine means 22 is of the type of construction shown in FIG. 7, having a central portion 27 situated at an elevation higher than the outer bottom portion 28, then the rotary carrier plate 29, which forms the bearing means which supports the magazine means, is of such a construction that it conforms to the construction of the bottom of the magazine means 22. Thus, the rotary carrier 29 has an outer peripheral portion extending beneath the slide compartments of the circular magazine means 22, and a central portion situated in a different plane extending closely beneath the central portion 27 of the magazine means 22.

In this way a hollow space is formed, surrounded by the magazine means and bearing means which supports the same, and the housing means 20 is provided in this case with a hollow housing portion 30 extending into the space which is surrounded by the central portion of the bearing means 29 and serving to accommodate a component of the projector. In the example illustrated in FIG. 7, a transformer 31 is shown as accommodated within the hollow housing portion 30.

The outer dimensions of the hollow housing portion 30 are so chosen that the rotary carrier 29, which is itself supported for rotary movement on a bearing member 32 which is laterally shiftable along an elongated slot 33 formed in the upper wall of the housing portion 30, can shift laterally with respect to the hollow housing portion 30 to such an extent that the rotary carrier 29, which can extend to a small extent outwardly beyond the left side of the housing, as viewed in FIGS. 7 and 8, in the operating position of the magazine means, can be shifted to an inner end position toward the right side of the housing means, as viewed in FIGS. 7 and 8, to a location where the rotary carrier 29 does not project outwardly beyond the periphery of the housing means. Thus, it is possible to displace the rotary carrier 29 to a rest position where it does not project beyond the housing means, and the carrier 29 is shown in solid lines in this position in FIG. 8. The carrier 29 is shown in dot-dash lines in its operative position in FIG. 8.

This lateral shiftability of the rotary carrier 29 which forms the bearing means for the magazine means need not be used solely for the above purpose. It is also possible with this construction to accommodate in the housing means 20 circular magazines of different diameters. Thus, beside a magazine means 22 having the illustrated diameter, it is possible, for example, to accommodate other circular magazines of smaller diameters in the housing means 20, and in this case the rotary carrier 29 can be shifted inwardly toward its inner end position so as to have an operating position, for example, corresponding to its rest position shown in solid lines in FIG. 8. In addition, the rotary carrier 29 will in this case have a flat, disc-like construction. Thus, with this latter type of construction, the circular magazine of relatively small diameter will not project outwardly beyond the volume bounded by the top and sides of the projector housing.

In the case where the two circular magazines differ not only with respect to the diameter but also with respect to the distance from one slide compartment to the next, then in order to provide the required stepwise advance of the magazine, it is necessary that the magazine advancing structure of the projector be capable of carrying out two different increments of advance.

FIG. 6 illustrates in dotted lines and in a schematic manner the image-projecting means which is situated in the magazine housing means 20 adjacent to and extending along the right side thereof, as viewed in FIG. 6. This image-projecting means includes the projection lamp 34, a hollow reflector 35, the pair of condenser lenses 36, and the support 37 which supports a slide in the projecting position. In the spaces defined by the dotted lines 38 and 39 are situated mechanical and electrical components of the projector.

What is claimed is:

1. In a photographic projector, projector housing means having a generally rectangular periphery defined in part by a pair of opposed sides of said housing means, image-projecting means carried by said housing means in the interior thereof adjacent and extending along one of said opposed sides thereof for projecting an image from a slide situated in a projecting position with respect to said image-projecting means, bearing means carrier by said housing means between said opposed sides thereof, and a circular magazine means supported for rotary movement by said bearing means, said magazine means being situated beside said image-projecting means so that slides can be successively displaced laterally beyond said magazine means to said projecting position and then back to said magazine means, said housing means extending to an elevation at least as high as the uppermost part of said magazine means so that in elevation said magazine means is entirely confined within said housing means and said magazine means having a circular exterior periphery more than half of which is situated within the periphery of said housing means, so that the generally rectangular periphery of said housing means remains substantially unchanged by accommodation of said magazine means in said housing means, said bearing means including a rotary carrier for supporting said magazine means and said housing means supporting said rotary carrier for lateral movement toward and away from said one side of said housing means.

2. The combination of claim 1 and wherein said rotary carrier is shiftable to and from an inner end position where it is closest to said one side of said housing means and where it does not project outwardly beyond the outer periphery of said housing means.

References Cited

UNITED STATES PATENTS

| | | | |
|---|---|---|---|
| 1,768,111 | 6/1930 | Branger | 88—27 |
| 2,076,924 | 4/1937 | Spindler | 88—27 |
| 2,146,452 | 2/1939 | Spindler | 88—27 |
| 2,843,951 | 7/1958 | Richards | 88—27 |
| 3,343,454 | 9/1967 | Mahoney | 88—27 |

NORTON ANSHER, *Primary Examiner.*

RICHARD M. SHEER, *Assistant Examiner.*